United States Patent
Seo et al.

(10) Patent No.: US 10,932,198 B2
(45) Date of Patent: Feb. 23, 2021

(54) METHOD FOR TRANSMITTING OR RECEIVING SIGNAL IN WIRELESS COMMUNICATION SYSTEM AND APPARATUS THEREFOR

(71) Applicant: LG ELECTRONICS INC., Seoul (KR)

(72) Inventors: Inkwon Seo, Seoul (KR); Kijun Kim, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/099,420

(22) PCT Filed: May 8, 2017

(86) PCT No.: PCT/KR2017/004738
§ 371 (c)(1),
(2) Date: Nov. 6, 2018

(87) PCT Pub. No.: WO2017/196025
PCT Pub. Date: Nov. 16, 2017

(65) Prior Publication Data
US 2019/0150097 A1 May 16, 2019

Related U.S. Application Data

(60) Provisional application No. 62/334,393, filed on May 10, 2016.

(51) Int. Cl.
*H04W 52/14* (2009.01)
*H04W 52/36* (2009.01)
(Continued)

(52) U.S. Cl.
CPC ......... *H04W 52/143* (2013.01); *H04L 1/0013* (2013.01); *H04W 52/14* (2013.01);
(Continued)

(58) Field of Classification Search
CPC ............. H04W 52/143; H04W 52/365; H04W 72/0473; H04W 52/14; H04W 52/283;
(Continued)

(56) References Cited

U.S. PATENT DOCUMENTS

2005/0013387 A1 * 1/2005 Ojard ............... H04B 1/719
375/316
2007/0161394 A1 * 7/2007 Kuroda .............. H04W 72/082
455/522

(Continued)

FOREIGN PATENT DOCUMENTS

KR 1020080026151 3/2008
KR 1020110122033 11/2011
(Continued)

OTHER PUBLICATIONS

PCT International Application No. PCT/KR2017/004738, Written Opinion of the International Searching Authority dated Jul. 24, 2017, 18 pages.

(Continued)

*Primary Examiner* — Hardikkumar D Patel
(74) *Attorney, Agent, or Firm* — Lee Hong Degerman Kang Waimey

(57) ABSTRACT

A method by which a terminal transmits an uplink signal in a wireless communication system, according to one embodiment of the present invention, comprises the steps of: receiving downlink control information including a power boosting indicator; determining, on the basis of the power boosting indicator, first transmission power of a first symbol to which power boosting is applied and second transmission
(Continued)

power of a second symbol to which no power boosting is applied; and transmitting the uplink signal according to the first transmission power and the second transmission power, wherein the power boosting indicator is activated when the interval between the first symbol and the second symbol is less than or equal to a predetermined distance and the difference between the first transmission power and the second transmission is greater than or equal to a predetermined power offset.

13 Claims, 12 Drawing Sheets

(51) Int. Cl.
*H04W 52/38* (2009.01)
*H04W 52/34* (2009.01)
*H04W 52/28* (2009.01)
*H04L 1/00* (2006.01)
*H04W 72/04* (2009.01)

(52) U.S. Cl.
CPC ......... *H04W 52/283* (2013.01); *H04W 52/34* (2013.01); *H04W 52/36* (2013.01); *H04W 52/365* (2013.01); *H04W 52/38* (2013.01); *H04W 72/0473* (2013.01)

(58) Field of Classification Search
CPC ..... H04W 52/34; H04W 52/36; H04W 52/38; H04W 72/04; H04W 52/346; H04W 52/04; H04W 52/02; H04W 52/0235; H04W 72/042; H04W 72/1289; H04W 52/22; H04W 52/58; H04W 52/146; H04W 52/248; H04W 52/362; H04W 52/225; H04W 52/325; H04W 76/19; H04W 72/0413; H04W 48/10; H04W 28/02; H04W 76/27; H04W 72/044; H04W 28/0247; H04W 72/0493; H04W 72/12; H04W 74/08; H04W 28/06; H04W 72/082; H04W 52/16; H04W 24/10; H04W 52/50; H04W 52/267; H04W 52/367; H04L 1/0013; H04L 5/0037; H04L 5/0053; H04L 5/001; H04L 5/0098; H04L 5/0058; H04L 5/0094; H04L 27/28; H04L 5/0007; H04L 5/0023; H04L 5/0028; H04L 5/0044; H04L 5/0064; H04L 5/0092; H04L 1/18; H04L 1/22; H04L 1/186; H04L 1/0072; H04L 1/1896; H04L 27/06; H04L 1/0015; H04J 11/003

See application file for complete search history.

(56) References Cited

U.S. PATENT DOCUMENTS

| | | | |
|---|---|---|---|
| 2011/0194523 A1* | 8/2011 | Chung | H04L 5/0053 370/329 |
| 2012/0044882 A1* | 2/2012 | Kim | H04W 72/0473 370/329 |
| 2015/0031410 A1* | 1/2015 | Lim | H04W 52/244 455/522 |
| 2015/0312074 A1 | 10/2015 | Zhu et al. | |
| 2015/0351081 A1* | 12/2015 | Zhu | H04J 11/003 370/329 |
| 2016/0100422 A1* | 4/2016 | Papasakellariou | H04L 1/1861 370/329 |
| 2018/0124684 A1* | 5/2018 | Kwon | H04W 28/0247 |

FOREIGN PATENT DOCUMENTS

| | | |
|---|---|---|
| KR | 1020130123448 | 11/2013 |
| WO | 2013119161 | 8/2013 |

OTHER PUBLICATIONS

ETSI, "Universal Mobile Telecommunications System (UMTS); Medium Access Control (MAC) protocol specification (3GPP TS 25.321 version 13.2.0 Release 13)", ETSI TS 125 321 V13.2.0, Apr. 2016, 219 pages.

European Patent Office Application Serial No. 17796325.3, Search Report dated Oct. 14, 2019, 11 pages.

Samsung, "Uplink control signalling structure (Revision of R1-041086)", R1-041222, 3GPP TSG-RAN WG1, Sep. 2004, 4 pages.

Qualcomm Incorporated, "Candidate Frame Structures", R1-162207, 3GPP TSG-RAN WG1 #84b, Apr. 2016, 12 pages.

* cited by examiner

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/004738, filed on May 8, 2017, which claims the benefit of U.S. Provisional Application No. 62/334,393, filed on May 10, 2016, the contents of which are all hereby incorporated by reference herein in their entirety.

TECHNICAL FIELD

The present invention relates to a wireless communication system, and more particularly, to a method for transmitting an uplink signal based on a specific transmission power value and apparatus therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

DISCLOSURE OF THE INVENTION

Technical Task

The object of the present invention is to provide a method for transmitting an uplink signal with transmission power drastically changed in a short time period and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages, in an aspect of the present invention, provided is a method for transmitting an uplink signal by a User Equipment (UE) in a wireless communication system. The method may include: receiving downlink control information including a power boosting indicator; determining first transmission power of a first symbol to which power boosting is applied and second transmission power of a second symbol to which no power boosting is applied based on the power boosting indicator; and transmitting an uplink signal with the first transmission power and second transmission power. In this case, the power boosting indicator may be activated when a distance between the first symbol and the second symbol is equal to or smaller than a predetermined distance and a difference between the first transmission power and the second transmission power is equal to or greater than a predetermined power offset.

In another aspect of the present invention, provided is a User Equipment (UE) for transmitting an uplink signal in a wireless communication system. The UE may include: a receiver configured to receive downlink control information including a power boosting indicator; a processor configured to determine first transmission power of a first symbol to which power boosting is applied and second transmission power of a second symbol to which no power boosting is applied based on the power boosting indicator; and a transmitter configured to transmit an uplink signal with the first transmission power and second transmission power. In this case, the power boosting indicator may be activated when a distance between the first symbol and the second symbol is equal to or smaller than a predetermined distance and a difference between the first transmission power and the second transmission power is equal to or greater than a predetermined power offset.

In the first symbol, the UE may transmit the uplink signal based on a Non-Orthogonal Multiple Access (NOMA) scheme, and in the second symbol, the UE may transmit the uplink signal based on an Orthogonal Multiple Access (OMA) scheme.

The UE may determine the first transmission power based on a first power offset set including multiple first power offset values and determine the second transmission power based on a second power offset set including multiple second power offset values, and a power range of the first power offset set may be greater than a power range of the second power offset set.

The downlink control information may further include a single Transmission Power Control (TPC) command field, and the UE may select one of the first power offset values and one of the second power offset values based on the single TPC command field.

The UE may configure a transient period for power change between the first symbol and the second symbol and perform rate matching or puncturing of the uplink signal in the transient period.

A location of the transient period may be determined by considering information mapped to each symbol or whether each symbol corresponds to either Non-Orthogonal Multiple Access (NOMA) or Orthogonal Multiple Access (OMA).

The UE may report a Power Headroom Report (PHR) on an uplink data channel and a PHR on an uplink control channel to a base station.

The uplink signal may be transmitted in a self-contained subframe with a downlink control region, an uplink data region, a Guard Period (GP) for switching between transmission and reception, and an uplink control region.

Advantageous Effects

According to an embodiment of the present invention, when transmitting an uplink signal, a UE can efficiently and accurately determine uplink transmission power drastically changed in a short time period by using a power boosting indicator included in downlink control information It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
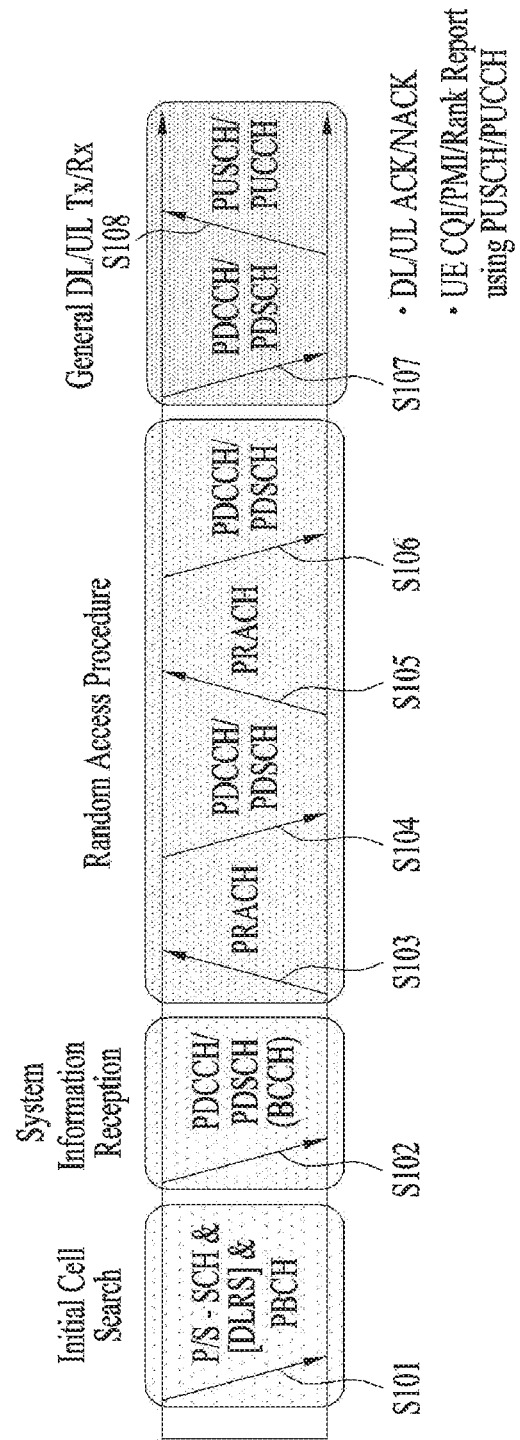
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/

NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
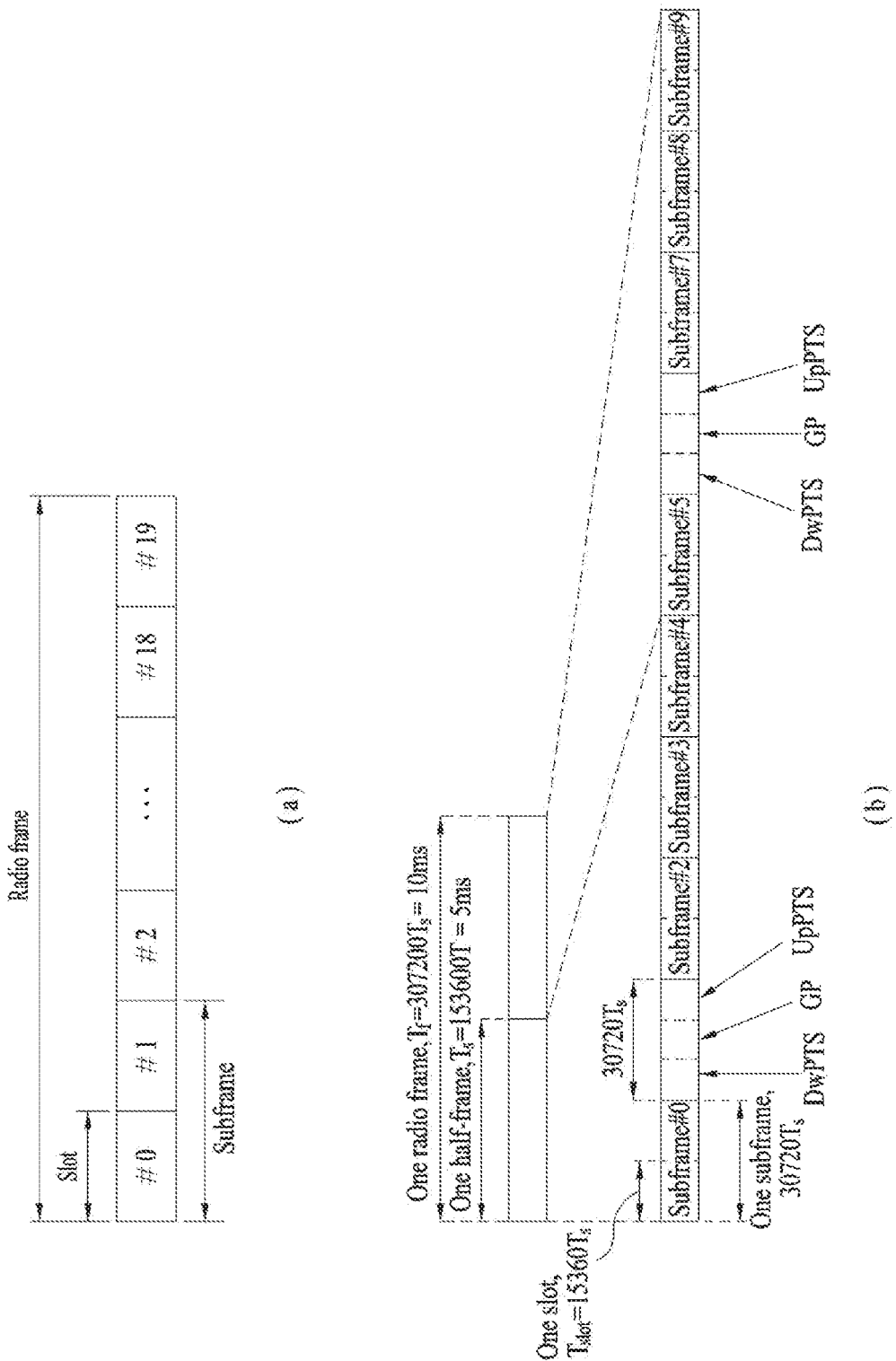
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
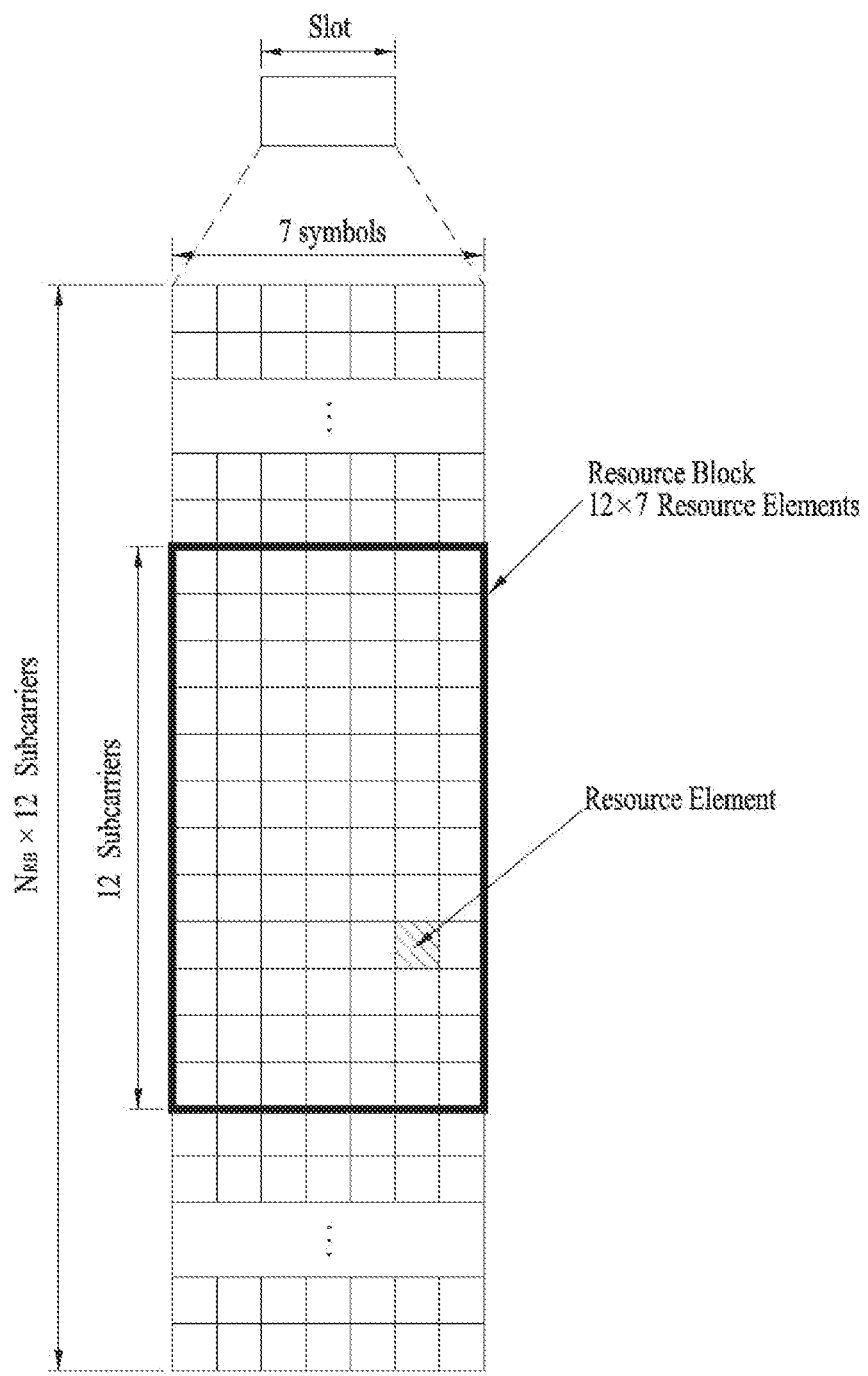
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
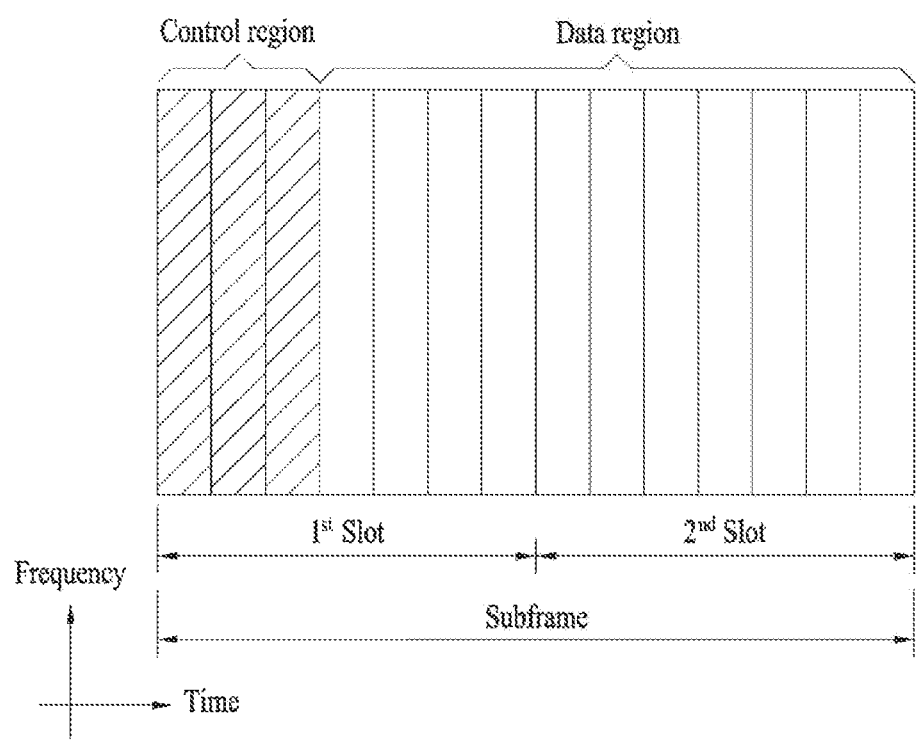
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
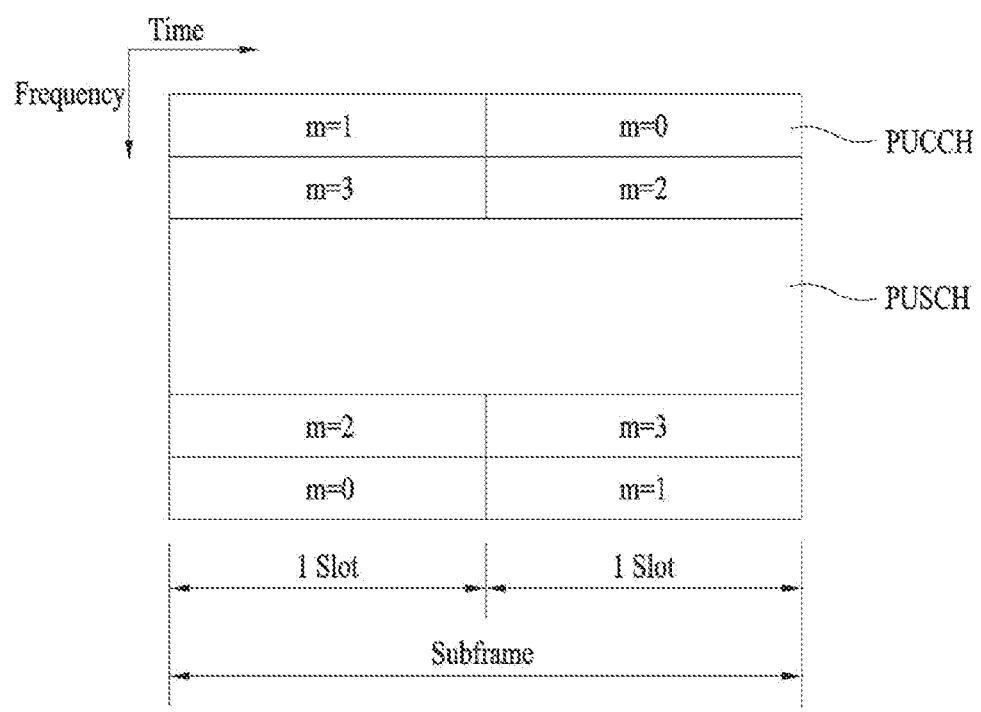
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR (Scheduling Request), HARQ-ACK and/or CSI (Channel State Information).

Hereinafter, a method for controlling uplink transmission power in the LTE system will be described.

A method by which a UE controls its uplink transmission power includes Open Loop Power Control (OLPC) and Closed Loop Power Control (CLPC). In the former case, the UE controls the uplink transmission power by estimating the attenuation of a downlink signal from an eNB of a cell to which the UE belongs and compensating for the estimated attenuation. That is, the UE increases the uplink transmission power when the downlink signal attenuation increases as a distance between the UE and eNB increases. In the latter case, the eNB directly transmits information (i.e. control signals) required for the UE to control the uplink transmission power.

Equation 1 below determines transmission power of a UE when serving cell c transmits only a PUSCH rather than simultaneously transmitting the PUSCH and a PUCCH in a subframe corresponding to subframe index i in a system supporting the carrier aggregation.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$ [Equation 1]

Equation 2 below determines PUSCH transmission power when serving cell c simultaneously transmits a PUCCH and a PUSCH in a subframe corresponding to subframe index i in a system supporting the carrier aggregation.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$ [Equation 2]

*The parameters, which will be described with reference to Equations 1 and 2, are to determine uplink PUSCH transmission power of a UE in serving cell c. Here, $P_{CMAX,c}(i)$ of Equation 1 indicates the UE's maximum transmission power in subframe index i, $\hat{P}_{CMAX,c}(i)$ of Equation 2 indicates the linear value of $P_{CMAX,c}(i)$, and $\hat{P}_{PUCCH}(i)$ of Equation 2 indicates the linear value of $P_{PUCCH}(i)$ (where $P_{PUCCH}(i)$ is PUCCH transmission power in subframe index i).

In Equation 1, $M_{PUSCH,c}(i)$ is a parameter indicating the bandwidth for PUSCH resource allocation, which is represented as the number of resource blocks valid for subframe index i, and is assigned by an eNB. $P_{O\_PUSCH,c}(i)$ is a parameter indicating the sum of a cell-specific nominal component, $P_{O\_NOMINAL\_PUSCH,c}(j)$, which is provided by higher layers, and a UE-specific component, $P_{O\_UE\_PUSCH,c}(j)$, which is provided by the higher layers, and is signaled to the UE by the eNB.

If PUSCH transmission/retransmission is performed according to a UL grant, j is set to 1. On the other hand, if the PUSCH transmission/retransmission is performed according to a random access response, j is set to 2. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$, and in this case, the parameters $P_{O\_PRE}$ and $\Delta_{PREAMBLE\_Msg3}$ are signaled by higher layers.

As a pathloss compensation factor, $\alpha_c(j)$ is a cell-specific parameter provided by higher layers and transmitted as 3 bits from the eNB. For j=0 or 1, the following condition is satisfied: $\alpha Å\{0, 0.4, 0.5, 0.6, 0.7, 0.8, 0.9, 1\}$. For j=2, $\alpha_c(j)=1$. The value of $\alpha_c(j)$ is signaled to the UE by the eNB.

$PL_c$ is a downlink pathloss (or signal loss) estimate value, which is calculated by the UE in the unit of dB and represented as $PL_c$=referenceSignalPower−higher layer filteredRSRP. Here, referenceSignalPower can be signaled to the UE by the eNB via higher layers.

In addition, $f_c(i)$ is a value indicating the current PUSCH power control adjustment state for subframe index i, and it can be expressed as a current absolute value or accumulated value. When accumulation is enabled on the basis of a parameter provided by the higher layer or a TPC command or when $\delta_{PUSCH,c}$ is included in a PDCCH along with DCI format 0 for serving cell C where CRC is scrambled with a temporary C-RNTI, the following equation is satisfied: $f_c(i)=f_c(i-1)+\delta_{PUSCH,c}(i-K_{PUSCH})$. In this case, $\delta_{PUSCH,c}(i-K_{PUSCH})$ is signaled through the PDCCH with DCI format 0/4 or 3/3A in subframe $i-K_{PUSCH}$. Here, $f_c(0)$ is the first value after reset of the accumulated value.

In the LTE standard, the value of $K_{PUSCH}$ is defined as follows.

For Frequency Division Duplex (FDD), $K_{PUSCH}$ has a value of 4. For Time Division Duplex (TDD), $K_{PUSCH}$ has values shown in Table 1.

TABLE 1

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In other cases except the DRX state, a UE attempts to decode a PDCCH of DCI format 0/4 with its C-RNTI or decode a PDCCH in DCI format 3/3A and a DCI format for an SPS C-RNTI with its TPC-PUSCH-RNTI in every subframe. If DCI formats 0/4 and 3/3A for serving cell c are detected in the same subframe, the UE should use $\delta_{PUSCH,c}$ provided in DCI format 0/4. For a subframe where there is no TPC command decoded for serving cell c or when DRX occurs or the subframe with index i is not an uplink subframe in the TDD, $\delta_{PUSCH,c}$ is 0 dB.

The $\delta_{PUSCH,c}$ accumulated values signaled on the PDCCH with DCI format 0/4 are shown in Table 2. If the PDCCH with DCI format 0 is validated through SPS activation or released, $\delta_{PUSCH,c}$ is 0 dB. The $\delta_{PUSCH,c}$ accumulated values on the PDCCH with DCI format 3/3A are one of SET1 shown in Table 2 or one of SET2 shown in Table 3, which are determined by the TCP-index parameter provided by higher layers.

TABLE 2

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH,c}$ [dB] |
|---|---|
| 0 | −1 |
| 1 | 1 |

If a UE reaches the maximum transmission power in serving cell c, $P^{\wedge}_{CMAX}(i)$, positive TPC commands are not accumulated regarding serving cell c. On the contrary, if the UE reaches the minimum transmission power, negative TPC commands are not accumulated.

Equation 3 below shows uplink power control for a PUCCH in the LTE system.

$$P_{PUCCH}(i) = \min\left\{\begin{array}{c} P_{CMAX,c}(i), \\ P_{0\_PUCCH} + PL_c + h(n_{CQI}, N_{HARQ}, n_{SR}) + \\ \Delta_{F\_PUCCH}(F) + \Delta_{TxD}(F') + g(i) \end{array}\right\}[dBm]$$ [Equation 3]

In Equation 3, i indicates a subframe index, and c indicates a cell index. When a UE is configured by higher layers to transmit a PUCCH over through two antenna ports, $\Delta_{TxD}(F')$ is provided to the UE by the higher layers. In other cases, $\Delta_{TxD}(F')$ is 0. The following parameters are related to a cell with cell index c.

Here, $P_{CMAX,c}(i)$ 1 is the UE's maximum transmission power, $P_{0\_PUCCH}$ is a parameter composed of the sum of cell-specific parameters and provided by the eNB through higher layer signaling, and $PL_C$ is a downlink pathloss (or signal loss) estimate, which is calculated by the UE in the unit of dB and represented as $PL_C$=referenceSignalPower– higher layer filteredRSRP. In addition, h(n) is a value depending on PUCCH formats, $n_{CQI}$ is the number of information bits with respect to Channel Quality Information (CQI), and $n_{HARQ}$ indicates the number of HARQ bits. Moreover, as a relative value with respect to PUCCH format 1a, the value of $\Delta_{F\_PUCCH}(F)$ corresponds to PUCCH format #F, which is provided by the eNB through higher layer signaling. Further, g(i) indicates the current PUCCH power control adjustment state of a subframe with index i.

If the value of $P_{0\_UE\_PUCCH}$ is changed by higher layers, g(0)=0. Otherwise, $g(0)=\Delta P_{rampup}+\delta_{msg2}$. $\delta_{msg2}$ is a TPC command indicated by a random access response, where $\Delta P_{rampup}$ corresponds to the total power ramp-up from the first to last preambles provided by higher layers.

If a UE reaches the maximum transmission power in the primary cell, $P_{CMAX,c}(i)$ positive TPC commands are not accumulated regarding the primary cell. On the contrary, if the UE reaches the minimum transmission power, negative TPC commands are not accumulated. The UE resets accumulation when the value of $P_{0\_UE\_PUCCH}$ is changed by higher layers or a random access response message is received.

Meanwhile, Tables 4 and 5 below shows the values of $\delta_{PUCCH}$ indicated by TPC command fields in DCI formats. In particular, Table 4 shows the $\delta_{PUCCH}$ values indicated by DCI except DCI format 3A, and Table 5 shows the $\delta_{PUCCH}$ values indicated by DCI format 3A.

TABLE 4

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5

| TPC Command Field in DCI format 3A | $\delta_{PUCCH}$ [dB] |
|---|---|
| 0 | −1 |
| 1 | 1 |

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
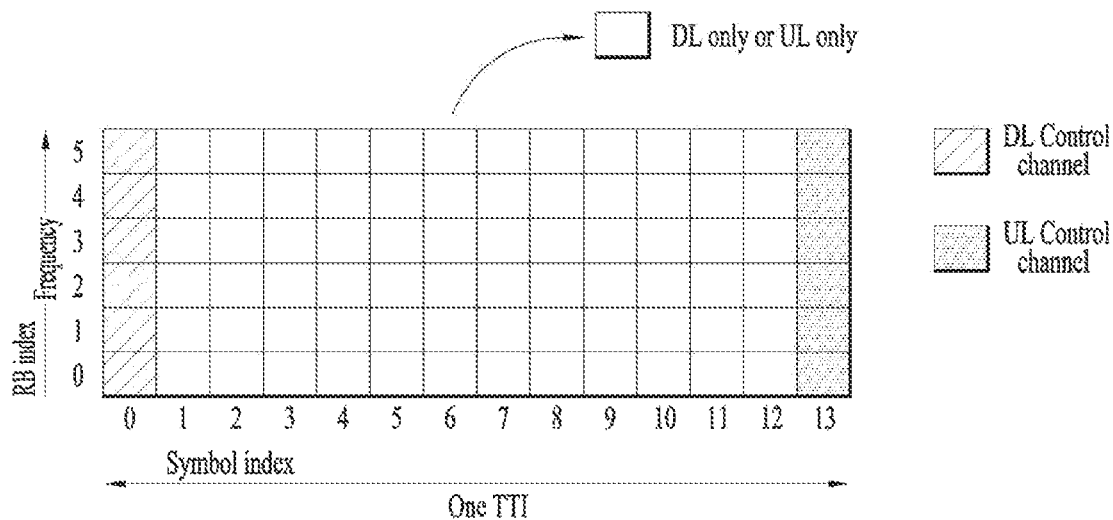
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
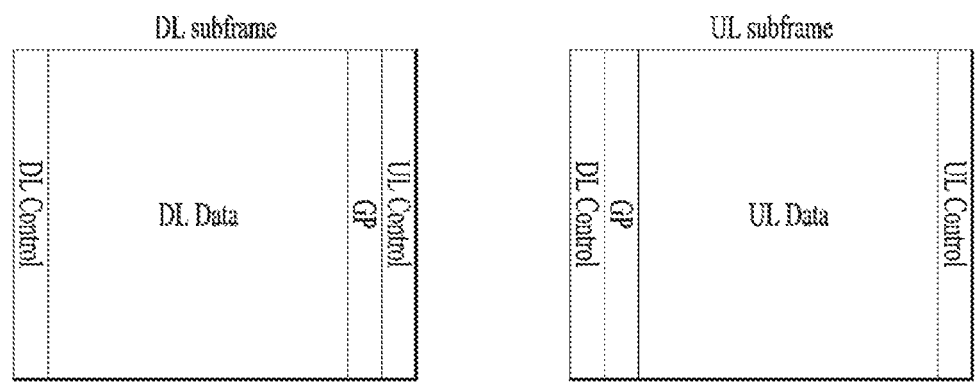
FIG. 7 is a diagram illustrating a downlink self-contained subframe and an uplink self-contained subframe according to one embodiment of the present invention.

FIG. 7 illustrates DL and UL subframes according to an embodiment of the present invention.

Referring to FIG. 7, a GP is located at a point where DL to UL switching occurs. For example, in a DL subframe, the GP is located between a DL data region and a UL control region, and in a UL subframe, the GP is located between a DL control region and a UL data region.

The GP may include Tx/Rx switching time of an eNB/UE and a Timing Advance (TA) for UE's UL transmission.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ(wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

Power Control for New RAT

In addition to the above-described self-contained subframe, the new RAT can use segmented subframes (e.g., small TTI) for the purpose of system flexibility increase and latency reduction. Moreover, various multiple access schemes can also be considered. Due to such segmented subframes and multiple access schemes, the new RAT may require power control in a wide range compared to the LTE system, and thus a method for handing power change in a wide range is required. Since the TPC commands of the LTE system can cover only a power range of −1 to 3 dB as described above in Tables 4 and 5, it is difficult to cover a wide power range and a relatively short TTI of the NR system.

Hereinafter, a method for controlling power in various ranges in the new RAT will be described with reference to the following embodiments.

First, cases in which power control in a wide range or rapid power change is needed will be explained.

Case 1: UL Multiple Access

In the new RAT, various uplink multiple access schemes have been discussed. Among these schemes, a Non-Orthogonal Multiple Access (NOMA) scheme in the code or power domain has been considered as a main issue. For example, Multi-User Shared Access (MUSA), Sparse Code Multiple Access (SCMA), Non-orthogonal coded multiple access (NCMA), and the like have been discussed.

For example, UL NOMA means a scheme of allocating identical UL resources to a plurality of UEs and performing multi-access in the power domain by adjusting transmission power of each UE.

Figure 8:
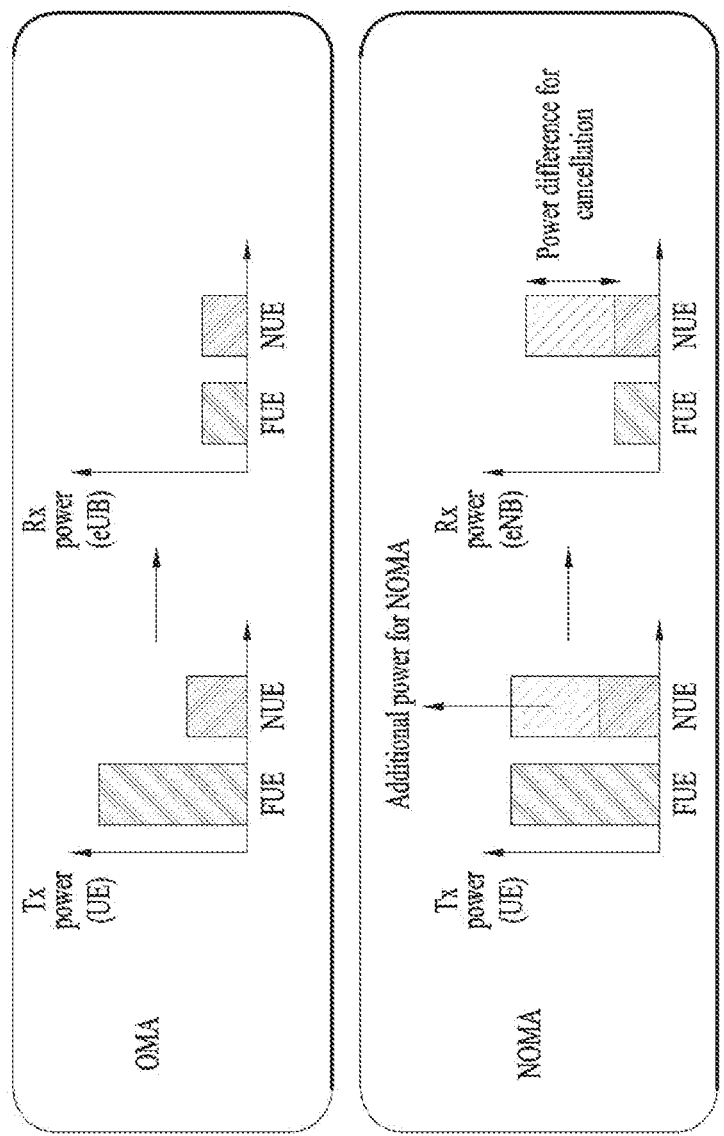
FIG. 8 illustrates uplink (UL) Non-Orthogonal Multiple Access (NOMA) according to an embodiment of the present invention.
Figure 8:
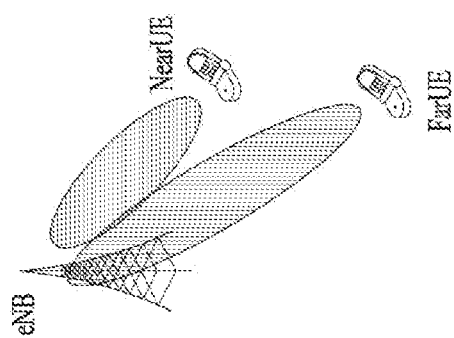

FIG. 8 illustrates UL NOMA according to an embodiment of the present invention.

In FIG. 8, OMA may means the conventional LTE uplink transmission. According to the OMA, an eNB may allocate different transmission power to each UE by considering an appropriate SINR that satisfies the reception requirements of the eNB. In this case, the resources used by individual UEs are orthogonal to each other.

If the NOMA is adopted as an uplink multiple access scheme, the eNB performs decoding using difference between received power from the perspective of the eNB unlike the OMA. For example, the eNB receives total signals where at least part of a signal transmitted from a first UE and a signal transmitted from a second UE are superposed on the same resource. Since the difference between the signal transmitted from the first UE and the signal transmitted from the second UE is significant, the two signals can be distinguished in the power domain. The eNB first decodes a signal with higher received power. Thereafter, after canceling the decoded signal from the total signals, the eNB decodes the signal with lower received power from the remaining signal.

For the above-described UL NOMA operation, the eNB should request a specific UE to perform transmission with higher transmission power (e.g., 10 dB) compared to the OMA.

It is assumed in the example of FIG. 8 that compared to the OMA, a Near UE (NUE) close to the eNB is allocated high transmission power for convenience of description. When the NOMA is applied to UL as described above, each UE should cover a transmission power range wider than that of the conventional LTE system.

Figure 9:
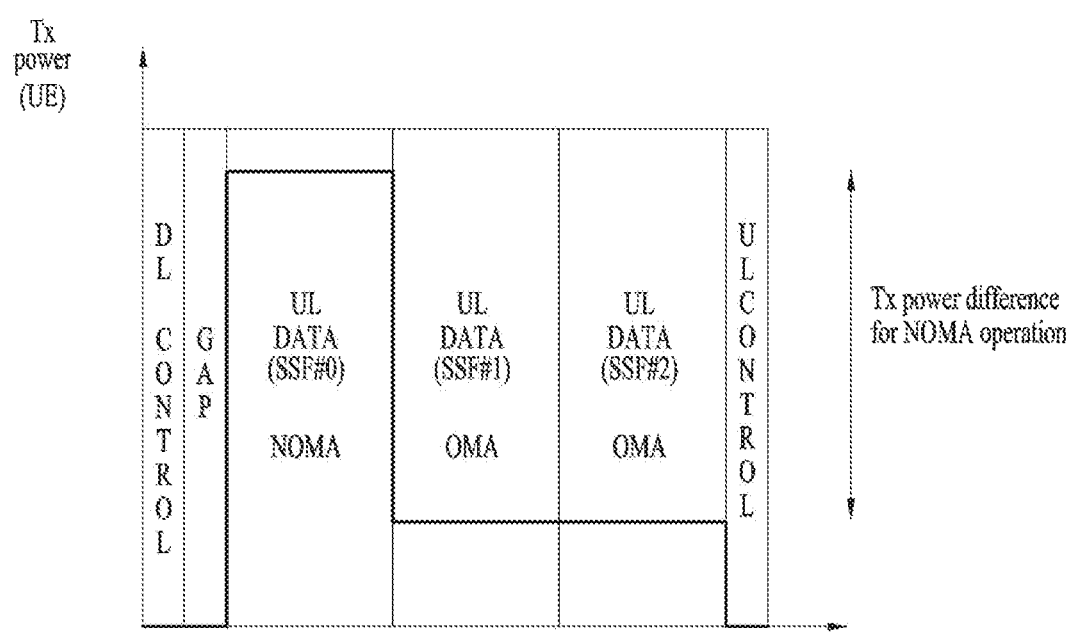
FIG. 9 illustrates changes in UL transmission power at a User Equipment (UE) according to an embodiment of the present invention.

FIG. 9 illustrates changes in UL transmission power at a UE according to an embodiment of the present invention.

A single self-contained subframe can include multiple small subframes (SSFs), and whether the NOMA is applied can be determined per SSF. In this case, a UE should be able to transmit a signal at transmission power with high power offsets (e.g., 10 dB) even in the same SF. For example, if the NOMA operation is applied only to a specific small subframe (e.g., SSF #0) as shown in FIG. 9, NUE's transmission power in SSF #0 may have a offset higher than NUE's transmission power in the remaining sections (e.g., SSF #1 and 2). For convenience of description, it is assumed that there is no UL control channel transmission in the SFs of FIG. 9.

Besides the example of FIG. 9, a case in which a UE should cover a power range larger than the transmission power range required for general UL transmission may occur depending on UL multiple access schemes. Thus, a power control method for covering such a large power range is needed.

Case 2: Symbol-Level TDM Between Data Channel and Control Channel

In the new RAT, a channel for carrying UL data (e.g., NR-PUSCH) and a channel for carrying control (e.g., NR-PUCCH) can be Time Division Multiplexed (TDMed) in the same subframe. In this case, symbols for transmitting the data channel and control channel may different transmission power due to difference between information (e.g., the number of information (or coded) bits), resources, and the like.

Alternatively, if a UE transmits a UL RS such as a Sounding Reference Signal (SRS) after the data channel by applying TDM, each symbol may have significantly different transmission power depending on difference between the bandwidth for transmitting the data and the bandwidth for transmitting the RS.

Figure 10:
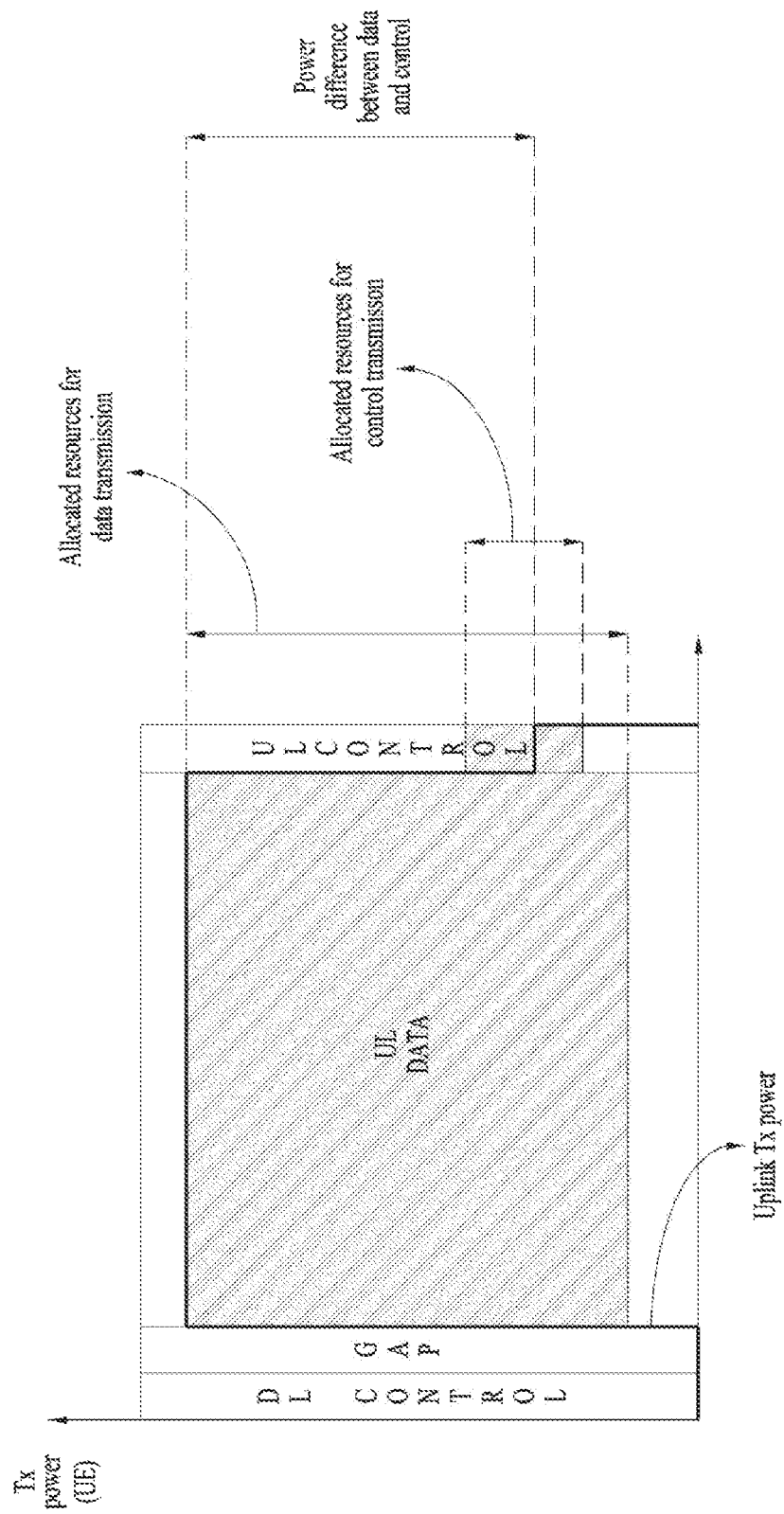
FIG. 10 illustrates changes in UL transmission power at a UE according to another embodiment of the present invention.

FIG. 10 illustrates changes in UL transmission power at a UE according to an embodiment of the present invention. Referring to FIG. 10, the data channel has a bandwidth much larger than that of the UL control channel. When the bandwidth for transmitting the data channel is different from the bandwidth for transmitting the control channel, symbols for transmitting the two channels may have different transmission power as shown in FIG. 10.

When the above-described multiple access scheme is applied, the transmission power difference depicted in FIG. 10 may become more serious. For example, assuming that transmission power is set according to an OMA scheme as shown in FIG. 10 and NOMA operation is applied only to a data channel, power boosting is applied to a data symbol to obtain NOMA gain, and thus power difference between data and control (or RS) symbols may significantly increase.

Hereinafter, UL power control methods and UE/eNB operations, which are applicable to the environment where UL transmission power sharply changes in a wide range as mentioned with reference to cases 1 and 2, will be described.

<Power Control Command of Large Step Size>

When a UE continuously transmits signals with high power offsets (e.g., offsets that are not supported in the conventional LTE) in the same subframe as shown in FIG. 9, a method by which an eNB or network informs the UE of the corresponding power values is required.

According to an embodiment of the present invention, power information indicating UL transmission (i.e., UL NOMA transmission) may be included in Downlink Control Information (DCI) for the NOMA operation illustrated in FIG. 9. To this end, for example, it is possible to introduce a power boosting indicator indicating that the power of a specific resource significantly increases. The eNB or network may indicate the UL NOMA operation through the power boosting indicator, or a NOMA indicator indicating whether the NOMA operation is applied may be used instead of the power boosting indicator. The power boosting indicator could be interpreted as an indicator indicating that either a small power offset or a large power offset needs to be selected depending on circumstances. An additional power offset value for the power boosting indicator may be added to the power value for a TPC command. For example, if the TPC command in DCI indicates a 1-dB increase, a UE may apply 1+10 dB to an interval where power boosting is activated by the power boosting indicator and 1 dB to an interval where no power boosting is activated. In other words, 10 dB could be interpreted as the additional power offset for the power boosting.

The power boosting indicator or UL NOMA indicator can be signaled via a specific time unit. For example, the specific time unit may include a subframe, a subframe set, a small subframe, or a small subframe set, but the invention is not limited thereto.

The transmission power to be used in an interval for UL NOMA transmission may be predefined or indicated by a TPC command with a high power offset (e.g., DCI). For example, a UE may perform the UL NOMA transmission by adding a power boosting offset (or NOMA power offset) to the UL transmission power, which will used within a predetermined time period after the NOMA operation, or the most recently used transmission power within a specific time window. The power boosting offset (or NOMA power offset) may be equal to or more than a predetermined size (e.g., 10 dB).

As another example, the network may define or configure multiple power offset tables (or sets) in advance. Depending on whether the power boosting (or UL NOMA) operation is performed, the power offset table to be used for corresponding data transmission can be determined. For example, at least one power offset table for NOMA and at least one power offset table for OMA may be defined or configured, respectively.

As a further example, use of an accumulated (or accumulate) TPC command can be assumed. It may be predefined that a UE needs to use a power offset table of $\{-1,0,1,3\}$ dB for normal transmission and use a power offset table of $\{-5,0,5,10\}$ dB in power boosting mode (e.g., NOMA operation). Alternatively, it may be signaled by the eNB. Thereafter, for the UL transmission to which the power boosting is applied, the UE may determine the transmission power in the power boosting mode by applying the power offset indicated by a TPC command among the power offsets of $\{-5,0,5,10\}$ dB.

The above-described use of multiple power offset sets is not limited to the UL NOMA, and it can be applied to various situations where large or small power offsets are required.

When multiple power offset sets are defined as described above, which offset a UE should use can be indicated by adding a power offset set indicator to DCI. Alternatively, it is possible to indicate the power offset set to be used by the power boosting indicator, instead of separately defining the power offset set indicator in the DCI. For example, the network may define four power offset sets and then instruct a UE to use a specific power offset through a 2-bit power boosting indicator.

It is assumed in the above example that accumulated TPC command is used for convenience of description, but the present invention is not limited thereto.

For example, the present embodiment can be applied to an absolute TPC command and an Open Loop Power Control (OLPC) parameter (e.g., P0). For example, an eNB may configure two P0 values (e.g., $P0_0$ and $P0_1$) for a UE via higher layer signaling and then instruct the UE to use a specific P0 value using a power boosting indicator or the like. Alternatively, it may be preconfigured that the UE should use a specific P0 value in a specific situation (e.g., NOMA operation). In the case of the absolute TPC command, the power boosting mode can be configured similar to the above-mentioned accumulated TPC command. For example, multiple power offset sets (e.g., set 1={−4,−1,1,4} dB and set 2={−10,−5,5,10} dB) may be predefined, and a UE may determine the power offset set to be used for a specific resource based on a power boosting indicator or the like.

Additionally, a power setting method for normal mode after the power boosting mode is terminated can also be defined. For example, when the power boosting mode is driven using the above-described additional power offset, it may be predefined that a normal mode offset is applied after reducing the power as much as the additional power offset at the time when the power boosting mode is switched to the normal mode. This can be applied even when multiple offset tables are used. Compared to the normal mode, if different offset tables where offsets have significant power difference are used, the power control may be performed with reference to a specific power value when the power boosting mode switches to the normal mode. Alternatively, the power control for the normal mode may be performed with reference to the power value before the boosting mode is applied.

<Time Mask>

The transient time where a UE can change transmission power to handle power difference between subframes (or between slots/symbols) can be defined. In addition, an exception rule may be made such that no power requirements are applied in such a transient period.

According to an embodiment of the present invention, it is proposed to define a time mask, which is similar to the transient period, in the new RAT. The term "time mask" can be interchangeably used with the term "transient period". Hereinafter, a time mask configuration method will be described in detail.

In case the transient period is required due to significant power difference between symbols, a symbol where the transient period is located among the symbols can be determined according to the types of channels transmitted in the individual symbols.

Figure 11:
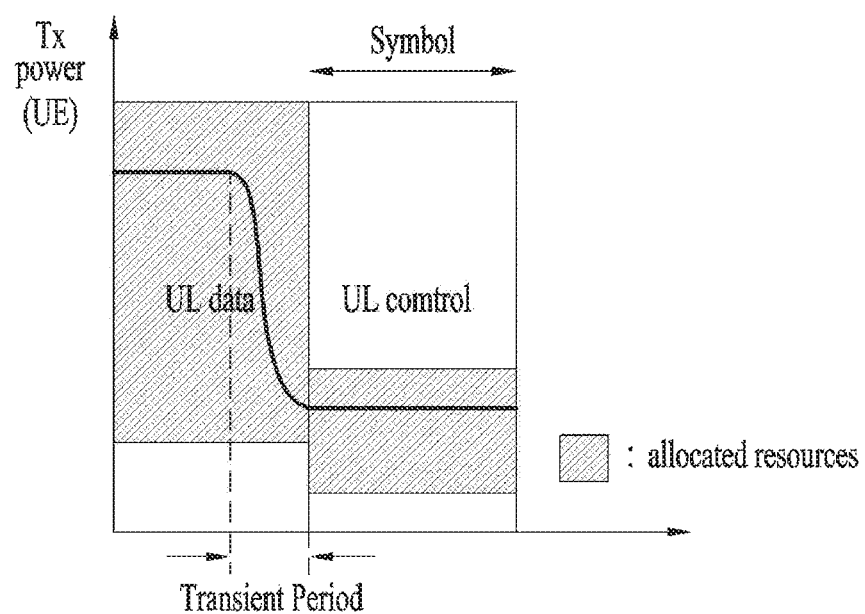
FIG. 11 illustrates changes in UL transmission power at a UE according to a further embodiment of the present invention.

FIG. 11 illustrates changes in UL transmission power at a UE according to an embodiment of the present invention.

For example, it is assumed that symbols for a data channel and symbols for a control channel (or symbols for transmitting an RS) are continuously arranged and different transmission power is configured for each symbol or transmission power difference is equal to or more than a predetermined level (e.g., 5 dB). In this case, a transient period may be defined such that it is located on a symbol for the data channel. This is because the number of symbols for transmitting the data channel is more than the number of symbols for transmitting the control channel. That is, it is possible to reduce the impact of the transient period relatively by locating the transient period on the data symbol.

As another example, a network may indicate the symbol where the transient period is located via higher layer signaling. For instance, when a plurality of UL control symbols are configured, if a UE does not transmit control information in a UL control symbols close to a data symbol or the UL control information has less importance (e.g., if the amount of the UL control information or bandwidth therefor is less than a threshold), an eNB may instruct the corresponding UE to configure the transient period in the first UL control symbol.

Meanwhile, when data symbols have different transmission power due to the UL multiple access scheme as shown in FIG. 9, the transient period may be configured in an OMA symbol (or a symbol that is not multiplexed with that of another UE). For example, it is assumed that symbols to which the NOMA is applied and symbols to which the NOMA is not applied exist in the same subframe and the NOMA symbols have higher transmission power. After decoding UL data transmission from a high-power UE, the eNB may cancel the corresponding signal and then decode UL data transmission from a low-power UE. Considering that a power values can affect the decoding performance in the NOMA transmission as described above, it is preferred to configure the transient period where the power value varies by avoiding the NOMA symbols. For example, when a corresponding UE operates as a high-power UE in SSF #0 and as a low-power UE in SSF #1 although it is observed from the perspective of the eNB that the NOMA operation is applied to both SSFs #0 and #1, the above-described transient period configuration method can be applied in the same manner. In other words, if a UE operates as a low-power UE, the transient period can be configured in a NOMA symbol. Similar to the above-described embodiment, the network can determine the symbol where the transient period is configured.

<Symbol Rate Matching or Puncturing>

The symbol length of the new RAT may become smaller than that of the LTE. If the proposed time mask is included in a specific symbol under this environment, information transmitted in the corresponding symbol may be severely distorted.

To solve this problem, an embodiment of the present invention proposes to perform data rate matching or puncturing with respect to a symbol where the power transient is required.

A method for determining a symbol where rate matching or puncturing is performed may be identical to the above-described transient period configuration method. For example, the symbol where the rate matching is applied may be determined according to the type of a channel where the corresponding symbol is transmitted, or the symbol where the rate matching is applied may be determined depending on whether a multiple access scheme is applied. Alternatively, a network may determine/indicate the symbol where the rate matching is applied among symbols with different power. In addition, the rate matching or puncturing may be defined such that it is applied when transmission power difference between symbols is equal to or more than a certain level or when the transmission power level indicated by a TPC command is equal to or more than the certain level. In this case, the certain level may be predefined or signaled by the network. Alternatively, the network may indicate a UL transmission interval of a UE or instruct to perform the rate matching (or puncturing) on a specific symbol(s).

Whether the proposed rate matching or puncturing is performed can be implicitly indicated/configured by setting a transmission interval where a UE should perform actual UL transmission. For example, when the transient period is required or when the length of the transient period is equal to or more than a predetermined level, the network or UE may not include a corresponding symbol(s) from the transmission interval.

For example, referring back to FIG. 11, when the above-mentioned rate matching conditions are satisfied, a UE may perform resource mapping by designating the symbol prior to the UL data symbol corresponding to the transient period as the ending symbol of UL data transmission. Alternatively, when the last UL data symbol is the $N^{th}$ symbol, when the UL control symbol is the $(N+1)^{th}$ symbol, and when the length of the transient period is greater than 1-symbol length (e.g., when the length of the transient period is greater than 1-symbol length and smaller than 2-symbol length), the UE may designate the (N−2)$^{th}$ symbol as the ending symbol of the UL data transmission. As described above, the end of an actual UL data region can vary in consideration of the transient period.

The proposed rate matching, puncturing, and transmission interval configuration may vary depending on the performance of a UE. To this end, the UE may report a UE category related to the transient period to the network. The UE category may be determined with reference to a time required for the UE to increase its power above a certain level. The UE category related to the transient period can be simply divided according to transient periods or further divided according to transient periods required for different power ramping levels. The network can know the location/number of symbols where a specific UE performs the rate-matching (or puncturing) or the starting/ending symbol of UL transmission performed by the specific UE based on the UE category report.

<Power Headroom Report for Power Boosting Mode>

It has been proposed that a network signals a transient period, a rate-matched (or punctured) symbol(s), and a UL transmission interval in a power-boosted state.

Meanwhile, since the UE's transmission power estimated by the network may be different from the actual UE's transmission power, the network requires information on the UE's transmission power (e.g., the current power state of the UE) in order to configure the power and transmission-related parameters for the UE in the power-boosted state. To this end, the present invention proposes that each UE reports information on UL transmission power to the network.

In the conventional LTE, an eNB can estimate UL bandwidth necessary for a specific UE to perform transmission through a Power Headroom Report (PHR). Specifically, in the LTE, the PHR contains difference between the maximum output power configured for the UE and PUSCH transmission power, and it is transmitted in the form of a MAC Control Element (CE). In addition, if the UE measures large path loss, the PHR is periodically reported by a PHR-related timer.

In an embodiment of the present invention, a PHR reporting method for the NR is proposed. The NR PHR can be replaced with the report on UE's actual transmission power, and the following PHR-related proposals can also be applied when actual transmission power is reported.

In the case of the NR PHR, the PHR on a UL data channel and the PHR on a UL control channel can be independently reported. In this case, since an eNB can calculate transmission power difference between the UL data channel and UL control channel, the eNB can accurately process the configuration change caused by power boosting.

For the NR PHR, measurement can be performed per subframe or symbol. On the other hand, for the conventional PHR, measurement is performed per subframe. Since in the NR, the number of symbols carrying UL data may be defined to be different from the number of symbols carrying UL control, a UE may perform PHR reporting/measurement every symbol. When the PHR is reported/measured per symbol, the UE may report difference between maximum output power configured per symbol and actual transmission power per symbol with respect to a corresponding channel The NR PHR can be periodically reported by a PHR-related timer, but the invention is not limited thereto. For example, the eNB may request the PHR in a specific situation such as power boosting or NOMA, and the UE may perform aperiodic PHR reporting based on the PHR request. In addition, the UE may perform PHR reporting when transmission power difference between the UL data channel and UL control channel is equal to or more than a certain level.

Moreover, whether the above-described embodiments are applied (or activated) can be determined by the system parameters of the network or service which the UE accesses, for example, subcarrier spacing, symbol length, etc. For instance, the NR may support multiple subcarrier spacing. If the subcarrier spacing of the network (or service) that the UE can access is 15 kHz and 75 kHz, the symbol length may be about 67 us and 13 us, respectively. In the case of 75 kHz, the configuration of the proposed transient period may become meaningless. For example, when 1-symbol length is 13 us, the UE may not secure sufficient actual power transient time even if a specific symbol is set to the transient period as described above.

Therefore, if the subcarrier spacing is more than a specific value, the UE may exclude a symbol(s) prior to the symbol where its power significantly changes from a UL transmission interval or perform rate matching (or puncturing) thereon. On the other hand, if the subcarrier spacing is less than the specific value, the UE may configure the transient period in a predetermined symbol and then perform power transition. In this case, the specific value for the subcarrier spacing can be predefined or signaled by the network.

As another method, a different transient period can be defined per subcarrier spacing (or subcarrier spacing group) supported by the NR (or per numerology). For example, in the NR, the time mask that defines the transient period can be defined per numerology.

Figure 12:
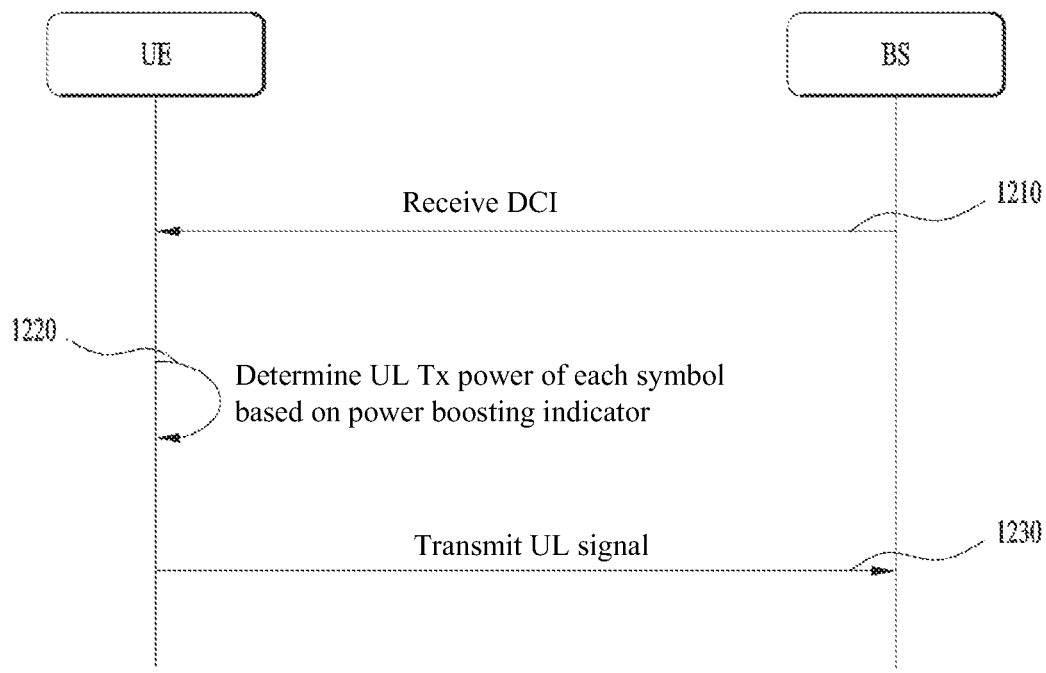
FIG. 12 illustrates a method of transmitting and receiving UL signals according to an embodiment of the present invention.

FIG. 12 illustrates a method of transmitting and receiving UL signals according to an embodiment of the present invention. FIG. 12 shows an example of implementing the above-described embodiments, but the invention is not limited thereto. Redundant description will be omitted.

Referring to FIG. 12, a UE receives DCI including a power boosting indicator [1210].

The UE determines, based on the power boosting indicator, first transmission power of a first symbol to which power boosting is applied and second transmission power of a second symbol to which power boosting is not applied [1220].

The UE transmits a UL signal with the first and second transmission power [1230].

The power boosting indicator may be activated when a distance between the first symbol and the second symbol is equal to or smaller than a predetermined distance and a difference between the first transmission power and the second transmission power is equal to or greater than a predetermined power offset.

In the first symbol, the UE may transmit the UL signal based on a NOMA scheme, and in the second symbol, the UE may transmit the UL signal based on an OMA scheme.

The UE may determine the first transmission power based on a first power offset set including multiple first power offset values and determine the second transmission power based on a second power offset set including multiple second power offset values. A power range of the first power offset set may be greater than a power range of the second power offset set.

The DCI may further include a single TPC command field. The UE may select one of the first power offset values and one of the second power offset values based on the single TPC command field.

The UE may configure a transient period for power change between the first symbol and the second symbol and perform rate matching or puncturing of the UL signal in the transient period.

A location of the transient period may be determined by considering information mapped to each symbol or whether each symbol corresponds to either the NOMA or OMA.

The UE may report a PHR on a UL data channel and a PHR on a UL control channel to a Base Station (BS).

The UL signal may be transmitted in a self-contained subframe with a DL control region, a UL data region, a GP for switching between transmission and reception, and a UL control region.

Figure 13:
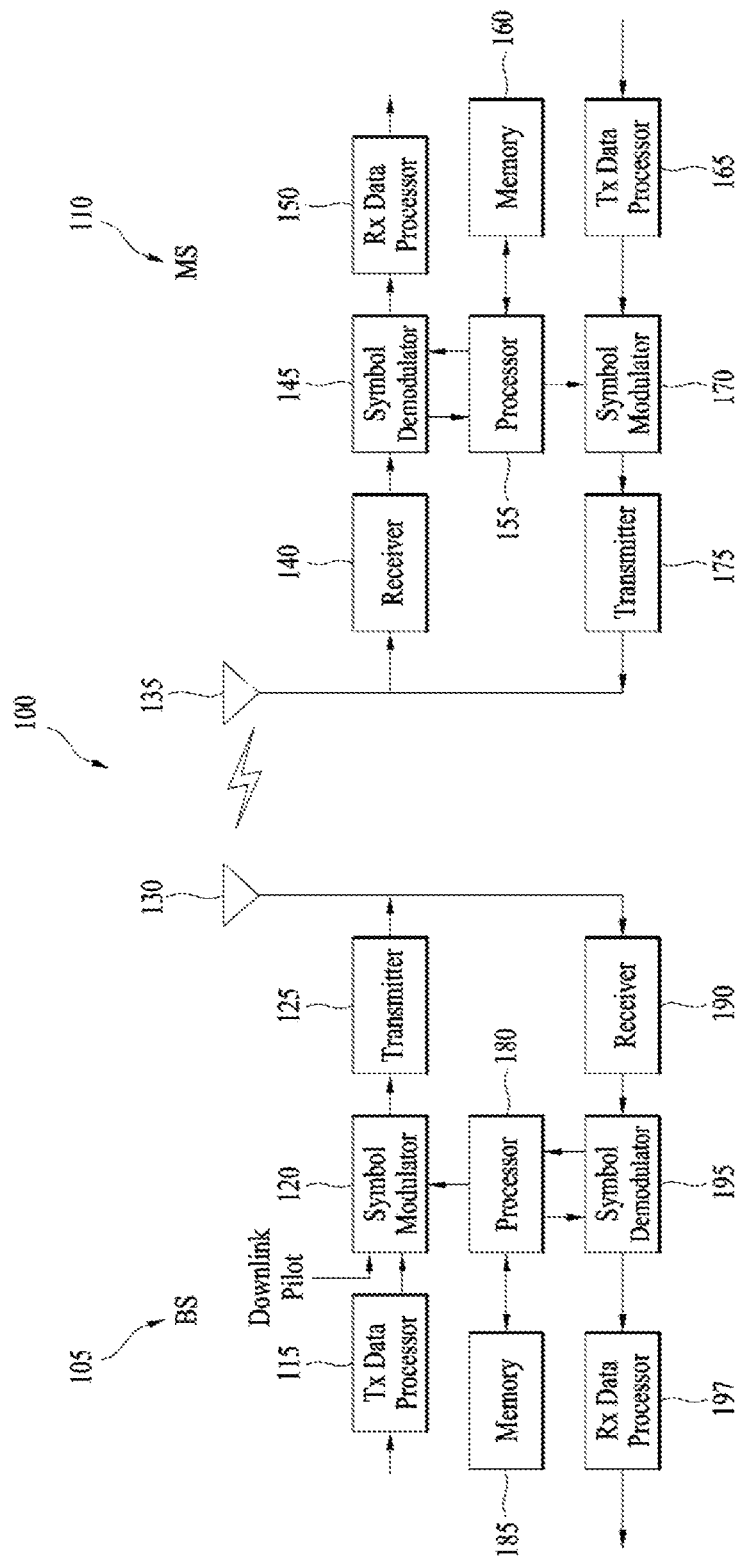
FIG. 13 illustrates a UE and a Base Station (BS) according to an embodiment of the present invention.

FIG. 13 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 13, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present invention supports an MIMO (multiple input multiple output) system. And, the eNB 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method for transmitting an uplink signal by a User Equipment (UE) in a wireless communication system, the method comprising:
    receiving downlink control information for scheduling a first uplink signal to be transmitted on a first symbol group and a second uplink signal to be transmitted on a second symbol group, the downlink control information including a power boosting indicator;
    based on the power boosting indicator, boosting a first transmission power of the first uplink signal relative to a second transmission power of the second uplink signal,
    wherein the first symbol group includes at least one Orthogonal Frequency Division Multiple (OFDM) symbol with Non-Orthogonal Multiple Access (NOMA) scheme, and the second symbol group includes at least one OFDM symbol with Orthogonal Multiple Access (OMA) scheme, and
    wherein both the first symbol group and the second symbol group are included in a subframe in a time domain; and
    transmitting the first uplink signal based on the boosted first transmission power and the second uplink signal based on the second transmission power.

2. The method of claim 1,
    wherein the boosted first transmission power and the second transmission power are determined based on a plurality of power offset tables,
    wherein the power boosting indicator further indicates a first power offset table used for determining the boosted first transmission power and a second power offset table used for determining the second transmission power among the plurality of the power offset tables, and
    wherein a power range of the first power offset table is greater than a power range of the second power offset table.

3. The method of claim 2,
    wherein the downlink control information further includes a single Transmission Power Control (TPC) command field, and
    wherein the boosted first transmission power is selected from the first power offset table based on the TPC command field, and the second transmission power is selected from the second power offset table based on the TPC command field.

4. The method of claim 1, wherein the UE configures a transient period for power change between the first symbol group and the second symbol group and performs rate matching or puncturing of an uplink signal in the transient period.

5. The method of claim 4, wherein a location of the transient period is determined based on information carried on the first symbol group and the second symbol group or a transmission scheme applied to the first symbol group and the second symbol group.

6. The method of claim 1, further comprising:
    reporting, to a base station, a Power Headroom Report (PHR) on an uplink data channel or a PHR on an uplink control channel.

7. The method of claim 1, wherein the first uplink signal and the second uplink signal are transmitted in a self-contained subframe with a downlink control region, an uplink data region, a Guard Period (GP) for switching between transmission and reception, and an uplink control region.

8. A User Equipment (UE) for transmitting an uplink signal in a wireless communication system, the UE comprising:
    a receiver configured to receive downlink control information for scheduling a first uplink signal to be transmitted on a first symbol group and a second uplink signal to be transmitted on a second symbol group, the downlink control information including a power boosting indicator;
    a processor configured to:
        based on the power boosting indicator, boosting a first transmission power of the first uplink signal relative to a second transmission power of the second uplink signal,
        wherein the first symbol group includes at least one Orthogonal Frequency Division Multiple (OFDM) symbol with Non-Orthogonal Multiple Access (NOMA) scheme, and the second symbol group includes at least one OFDM symbol with Orthogonal Multiple Access (OMA) scheme, and wherein both the first symbol group and the second symbol group are included in a subframe in a time domain; and a transmitter configured to transmit the first uplink signal based on the boosted first transmission power and the second uplink signal based on the second transmission power.

9. The UE of claim 8, wherein the boosted first transmission power and the second transmission power are determined based on a plurality of power offset tables, wherein the power boosting indicator further indicates a first power offset table used for determining the boosted first transmission power and a second power offset table used for determining the second transmission power among the plurality of the power offset tables, and wherein a power range of the first power offset table is greater than a power range of the second power offset table.

10. The UE of claim 9, wherein the downlink control information further includes a single Transmission Power Control (TPC) command field, and wherein the boosted first transmission power is selected from the first power offset table based on the TPC command field, and the second transmission power is selected from the second power offset table based on the TPC command field.

11. The UE of claim 8, wherein the processor is configured to configure a transient period for power change between the first symbol group and the second symbol group and perform rate matching or puncturing of an uplink signal in the transient period.

12. The UE of claim 11, wherein a location of the transient period is determined based on information carried on the first symbol group and the second symbol group or a transmission scheme applied to the first symbol group and the second symbol group.

13. The UE of claim 8, wherein the processor is configured to report, to a base station, a Power Headroom Report (PHR) on an uplink data channel or a PHR on an uplink control channel.

* * * * *